US006434807B1

(12) United States Patent
Begin

(10) Patent No.: US 6,434,807 B1
(45) Date of Patent: Aug. 20, 2002

(54) APPARATUS FOR REMOVING AND REPLACING COIL SPRINGS AND FASTENERS

(76) Inventor: Paul Begin, 145 Whipple Rd., Pascoag, RI (US) 02859

( * ) Notice: Subject to any disclaimer, the term of this patent is extended or adjusted under 35 U.S.C. 154(b) by 0 days.

(21) Appl. No.: 09/631,012

(22) Filed: Aug. 2, 2000

(51) Int. Cl.[7] .................................................. B23P 19/04
(52) U.S. Cl. ................................. 29/227; 29/240; 269/3
(58) Field of Search ........................... 254/10.5; 29/227, 29/240; 269/207, 212, 215, 3

(56) References Cited

U.S. PATENT DOCUMENTS

| | | | | | |
|---|---|---|---|---|---|
| 2,837,813 | A | | 6/1958 | Anselmo et al. | |
| 2,883,742 | A | * | 4/1959 | Prath | 29/227 |
| 2,885,769 | A | * | 5/1959 | Brown | 254/17 |
| 3,747,895 | A | * | 7/1973 | Martin | 254/10.5 |
| 4,219,918 | A | * | 9/1980 | Klann | 29/227 |
| 4,603,461 | A | | 8/1986 | Whippie et al. | |
| 4,872,644 | A | | 10/1989 | Papapetros | |
| 5,477,598 | A | * | 12/1995 | Borner, Jr. | 254/10.5 |
| 5,954,314 | A | * | 9/1999 | Weisshaar | 254/10.5 |

* cited by examiner

*Primary Examiner*—Joseph J. Hail, III
*Assistant Examiner*—Lee Wilson
(74) *Attorney, Agent, or Firm*—Garvey, Smith, Nehrbass & Doody, LLC; Gregory C. Smith

(57) ABSTRACT

An apparatus for removing coil springs having a first upright handle member terminating on its upper end with a threaded drive block for accommodating a steel screw threadable through the drive block and movable along the threaded shaft. There is provided a first spring block secured to the upper face of the drive block for accommodating a first end of a coil spring. There is a second spring block on an end portion of the steel drive screw for accommodating the second end of the coil spring, so that rotation of the drive screw expands or retracts the distance between the first and second spring blocks, and would expand or retract the spring in sufficient distance to remove or replace the spring. There is further provided a guide plate below the second spring block, having a slot for accommodating a first bar for pushing or pulling a spring out of engagement and for accommodating a second bar having a member for pushing or pulling a spring out of engagement or pulling a cotter pin out of engagement. There is further provided spring engagement members slidably mounting both spring blocks that compress a spring on a rod.

13 Claims, 6 Drawing Sheets

82
80
91
90
64
60
70
69
68
33
46
54
48
24
20
39
38
32
29

APPARATUS FOR REMOVING AND REPLACING COIL SPRINGS AND FASTENERS

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The apparatus of the present invention relates to tools for removing items. More particularly, the present invention relates to an apparatus for removing coil springs by elongating or compressing the springs and removing other fasteners such as cotter pins, particularly in difficult and hard to engage areas of placement.

2. General Background of the Invention

During work that is done on mechanical apparatuses such as machines or the like, often times, one of the most difficult tasks that are involved in the work project is the removal of springs which are utilized as part of the overall apparatus, and the replacement of those springs or new springs when the work is being completed. The difficulty in removing coil springs is the fact that often times the spring has been expanded or stretched to a considerable degree, and it is often virtually impossible for a person to use a conventional tool such as a screwdriver or the like to unsecure one end of the spring without being very work intensive and imposing a high degree of danger when the spring may finally be released from its stretch mode and will instantaneously retract to its constricted mode which may impose injury to the person working in the area. Additionally, during such work, such items such as cotter pins need to be released from their place in the machinery, and cotter pins at times can be very difficult to remove from a work piece since often times they have been in place for quite a while and will not simply release through the use of conventional tools. Likewise, when the work done on the apparatus is nearing completion, the springs or new springs must be replaced in order for the work piece to be complete, and therefore the spring has to be extended from its compressed mode to its extended mode on the apparatus which often times cannot be done manually through the strength of a person but must require additional assistance with tools.

Therefore, there is a need in the industry for an apparatus which can be used to assist in the compression or the expansion of particularly coiled springs or the like, which will make the task much simpler, less work intensive, and provide a high degree of safety for the worker involved in the task. There are prior art patents which have been cited in applicant's statement of the prior which is being submitted herewith, which attempt to solve the problem, but fall short of the task that has been achieved by the present invention.

BRIEF SUMMARY OF THE INVENTION

The apparatus of the present invention solves the shortcomings in the art in a simple and straightforward manner.

What is provided is an apparatus for removing coil springs having a first upright handle member terminating on its upper end with a threaded drive block for accommodating a steel screw threadable through the drive block and movable along the threaded shaft. There is provided a first spring block secured to the upper face of the drive block for accommodating a first end of a coil spring. There is a second spring block on an end portion of the steel drive screw for accommodating the second end of the coil spring, so that rotation of the drive screw expands or retracts the distance between the first and second spring blocks, and would expand or retract the spring in sufficient distance to remove or replace the spring. There is further provided a guide plate below the second spring block, having a slot for accommodating a first bar for pushing or pulling a spring out of engagement and for accommodating a second bar having a means for pulling a cotter pin out of engagement. Lastly, there is provided a means for allowing the apparatus to be attached via a chain or the like to a base so as to extend the length of the spring puller when engaging a spring that must be pulled a greater distance than the maximum distance between the first and second spring blocks.

Therefore, it is a principal object of the present invention to provide an apparatus for compressing or stretching coil springs so as to engage or disengage the coil springs during a work operation;

It is a further principal object of the present invention to provide an apparatus for engaging or disengaging coil springs, and having the ability to engage ends of springs which are quite difficult to engage yet to achieve the necessary engagement of the springs to stretch or compress the springs;

It is a further object of the present invention to provide an apparatus for allowing a spring to be stretched from a position of engagement to a point that the ends of the spring may be disengaged from their engagement without the spring inadvertently having the ability to compress rapidly thus avoiding injury to a worker;

It is a further object of the present invention to provide an apparatus which allows the stretching of a spring to a necessary distance so as to disengage the spring from engaging, or to compress a spring to a point necessary to allow the spring to be engaged on a work piece in the compressed mode which would not normally be done manually by a worker.

It is a further object of the present invention to provide an apparatus which in addition to compressing or expanding coil springs, has the ability to disengage cotter pins from engagement on a work piece which could normally not be disengaged manually.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
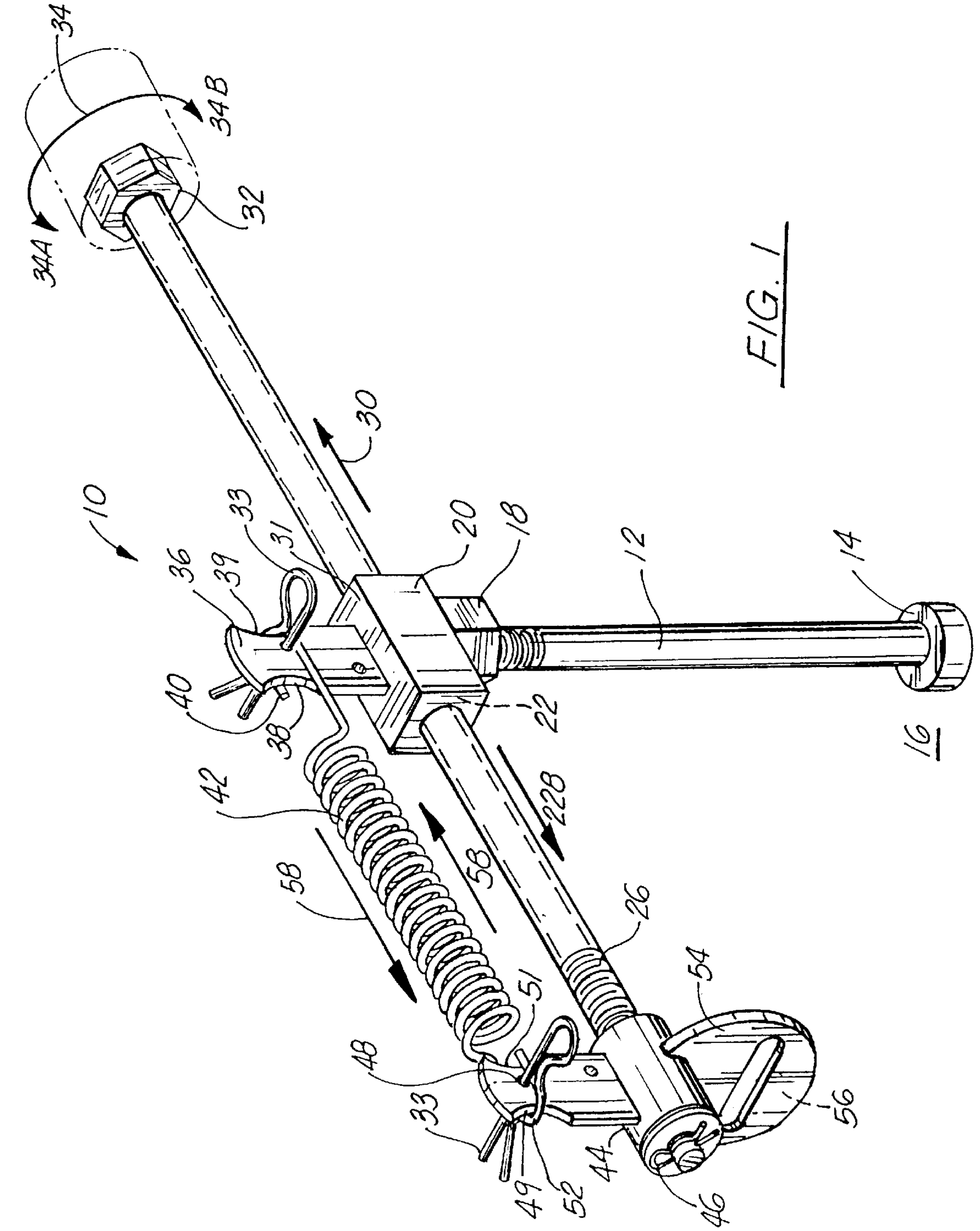
FIG. 1 illustrates the preferred embodiment of the apparatus of the present invention illustrating the expansion of a coil spring in the preferred embodiment.

FIGS. 1–9 illustrate the preferred embodiment of the apparatus of the present invention by the numeral 10 as used in the various configurations for undertaking the task of coupling or uncoupling coil springs and the like items during work on a work piece such as an engine. As illustrated in FIG. 1, apparatus 10 would comprise generally a vertical handle member 12 having a lower base 14 for resting on a table or the like 16. Vertical handle 12 would be engaged via a nut 18 to a drive block 20 which is a rectangular block having a threaded port 22 there through for accommodating a drive screw 24 which is threaded at threads 26 so that upon rotation of drive screw 24, the drive screw moves in the direction of arrows 28 or 30 depending on the rotation of the drive screw. Drive screw 24 has on its first end a hex nut 32 which would allow grasping with a wrench or the like so the rotation of the drive screw in the direction of arrow in either direction as shown in arrow 34. As further illustrated in FIG. 1, drive block has an upper surface 31 which includes an upright spring block 36. Spring block 36 having a pair of indented side portions 38, 39 which as seen in FIG. 1, indentation 39 for accommodating the end 40 of a coil spring 42. The second end of drive screw 24 would include a drive nut 44 which is held in place via a cotter pin 46, with drive nut likewise having an upright spring block 48, again with side walls 49, 51 indented to accommodate the second end 52 of coil spring 42. As further illustrated, the lower sets of drive nut 44 would include a circular guide 54 with the guide having a slot 56 for the reasons that will be explained further.

As illustrated in FIG. 1, in operation the coil spring 42 as was stated earlier has a first end 40 and a second end 52 engaged within spring blocks 36 and 48 respectively, with hitch pin cotters 33 engaged on spring blocks 36 and 48 to prevent spring 42 from disengaging. Upon rotation of the drive nut 32 in the direction of arrow 34A, the spring would be expanded in the direction of arrow 58 so as to allow the spring to be expanded to a point where it could be, for example, replaced back onto a work piece or to be expanded for other reasons such as cleaning or the like for whatever the reason might be. Of course, when one would wish to retract the spring back to its original compression, the nut 32 would be rotated in the direction of arrow 34B wherein the drive nut would rotate to allow the end 44 of the drive nut 24 to move in the direction of arrow 58 and therefore return to its normal compression.

Figure 2:
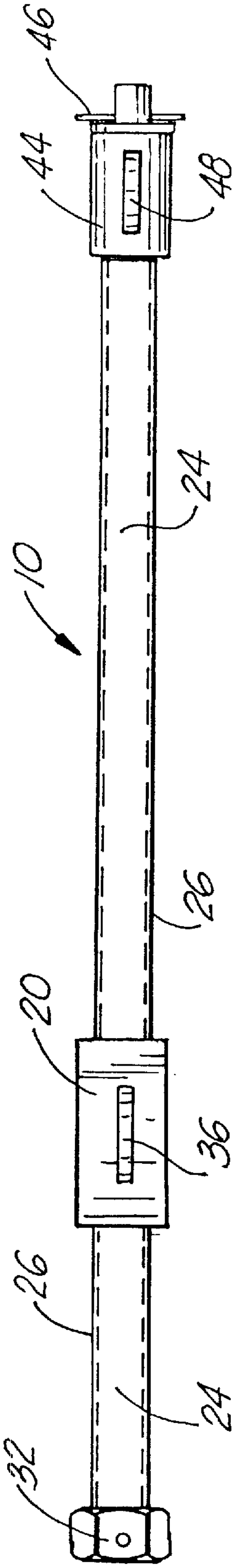
FIGS. 2 and 3 illustrate top and side views respectively of the preferred embodiment of the apparatus of the present invention.
Figure 3:
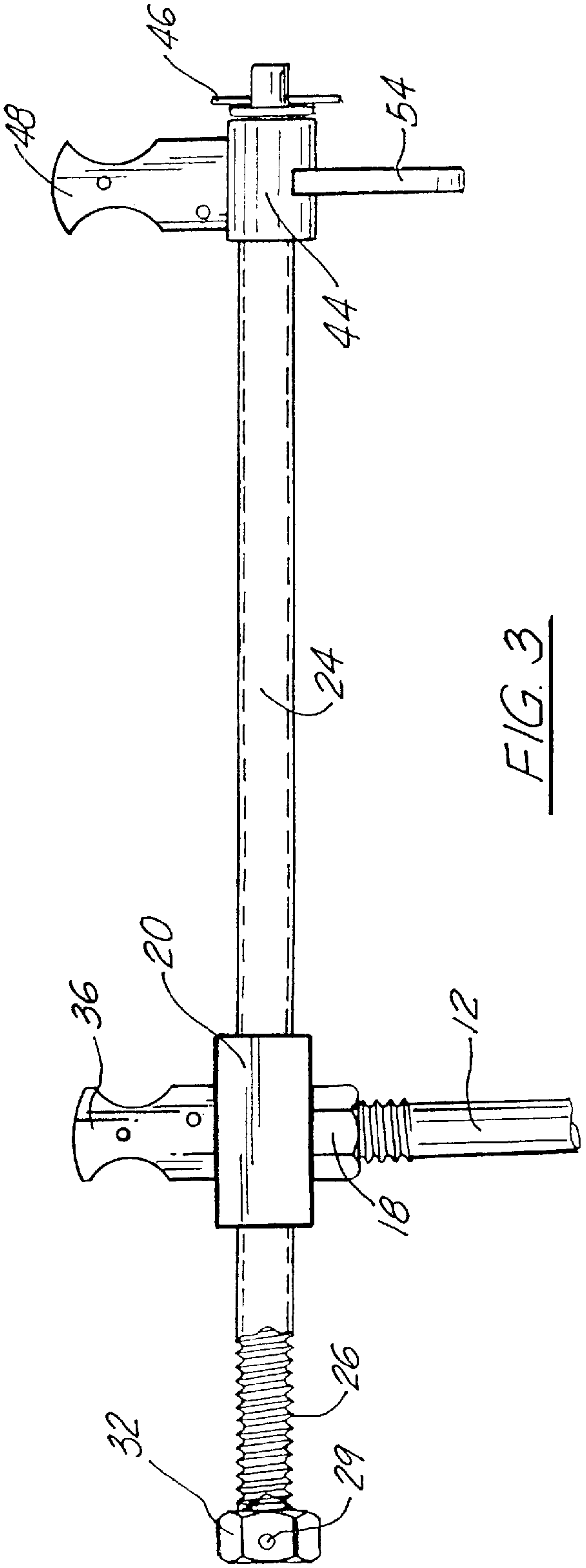

Next, reference is made to FIGS. 2 and 3 which are top views of the apparatus of the present invention as was disclosed in FIG. 1 with the exception that there is no coil spring 42 attached to the spring blocks 36, 48 as illustrated in FIG. 1. FIGS. 2 and 3 simply illustrate the tool itself in top and side views respectively showing how the apparatus appears when it is in the configuration ready to be put to use during the operation of the tool.

Figure 4:
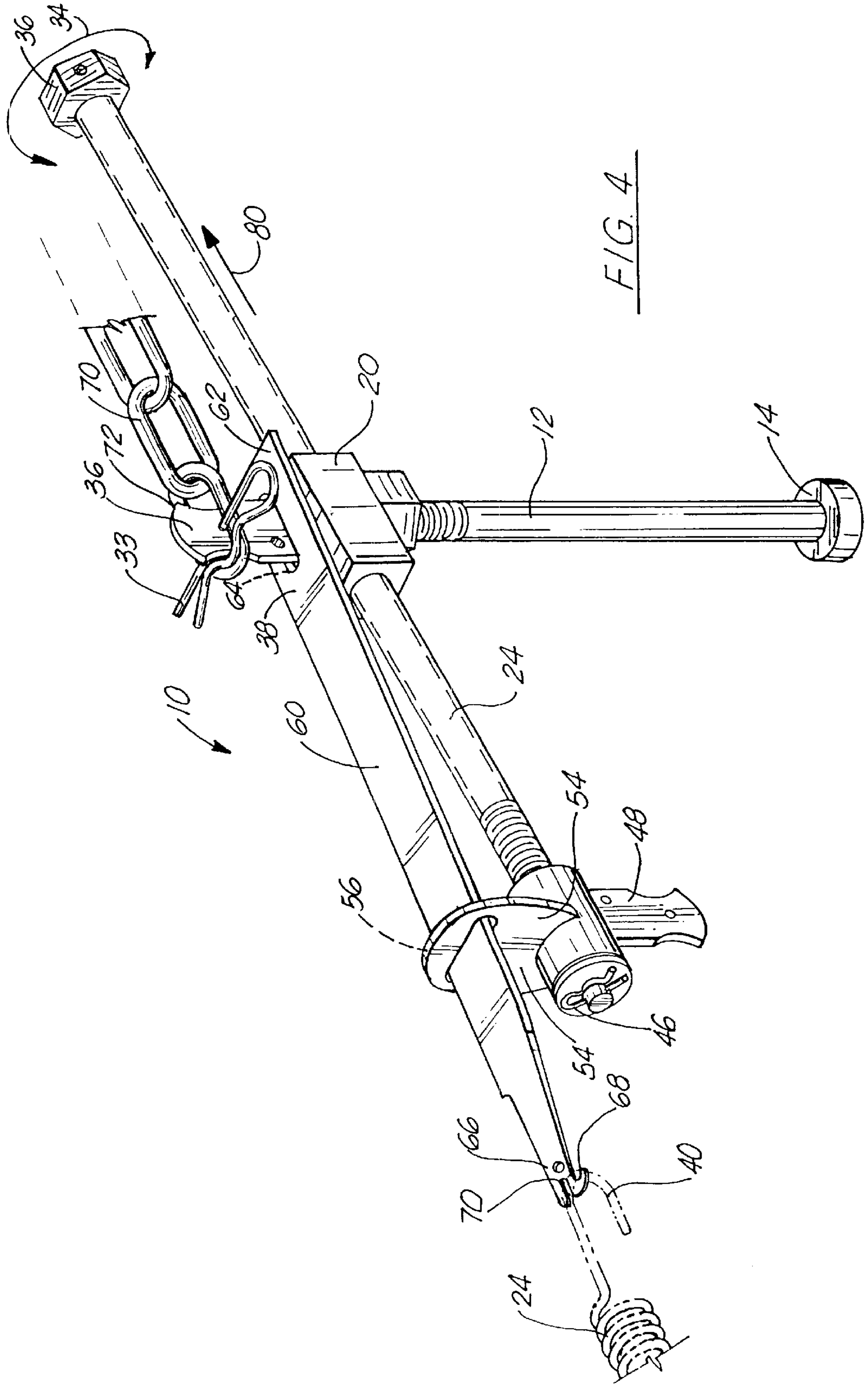
FIG. 4 illustrates the preferred embodiment of the apparatus of the present invention being used to stretch a coil spring a greater distance than the distance in the apparatus as illustrated in FIG. 1.
Figure 5:
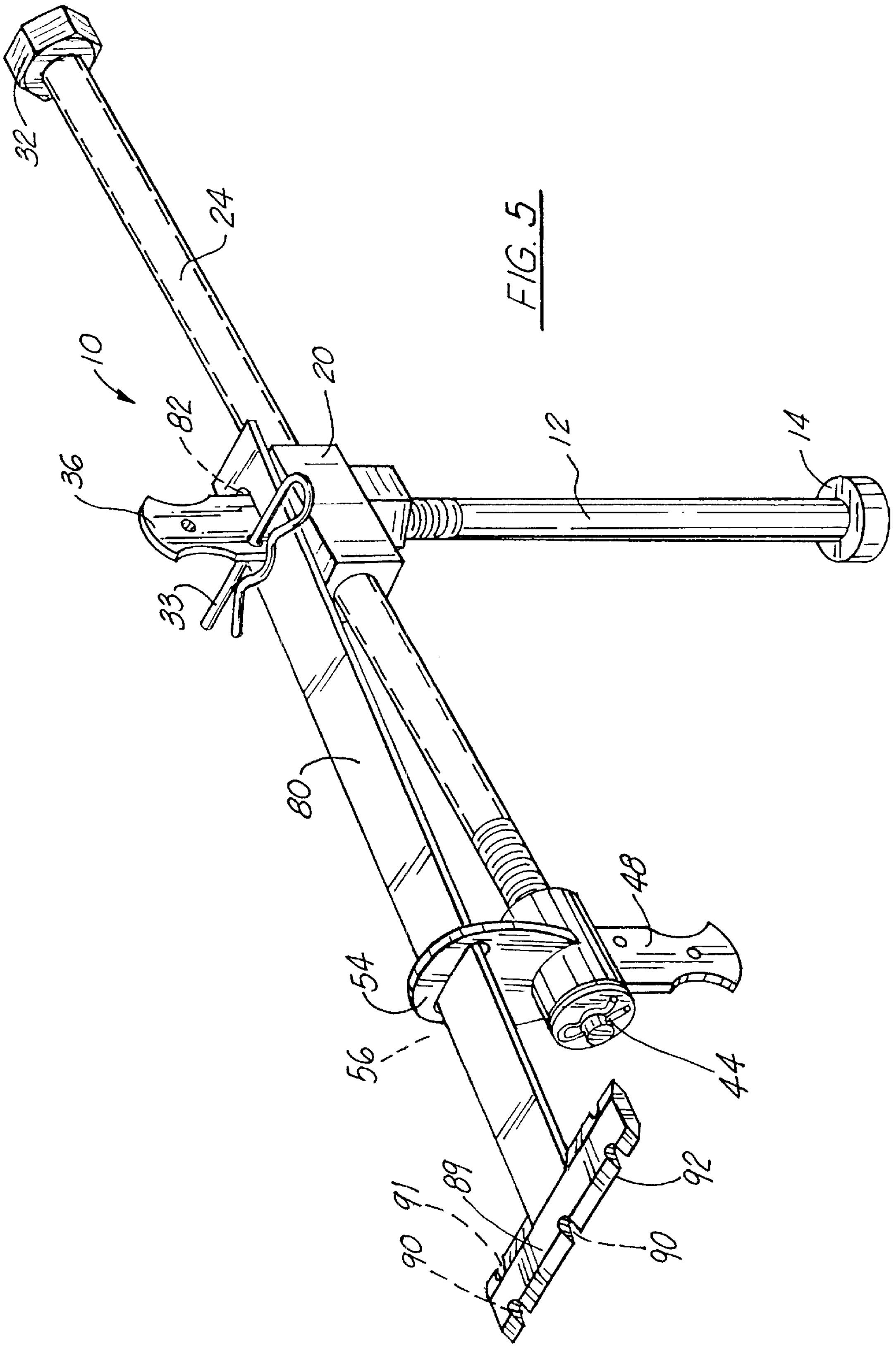
FIG. 5 illustrates the preferred embodiment of the apparatus of the present invention illustrating a means to engage a coil spring from its mounted position through the use of a specialized tool member.

Reference is now made to FIG. 4 where there is illustrated the apparatus 10 which has been reconfigured to accommodate a job whereby a coil spring 24 must be expanded beyond the length that could be done with the apparatus as illustrated in FIG. 1. In this particular configuration, again apparatus 10 is illustrated with the components as recited earlier in regard to FIG. 1. The difference in this particular configuration is the fact that there is provided a bar member 60 which is positioned with a first end 62 having a slot 64 which slides over upright spring block 36. As illustrated further, in order to accommodate bar 60, guide 54 has been rotated to the upright position, with the slot 56 allowing the bar to be placed through the slot so as to support it on its second end 66 as illustrated in FIG. 4 in order to accomplish the task at hand. The second end 66 of bar 60 includes a hook member 68 with a groove 70 with the hook member 68 engaging an end for example 40 of spring 24. There is further provided a chain 70 which has a first link 72 engaged within groove 38 of spring block 36 with the second end of chain 70 (not illustrated) engaged to a remote post or the like A as seen in FIG. 4, so that as the nut 36 is rotated the shaft 24 extends rearwardly in the direction of arrow 80, and would allow the spring 24 to be expanded whatever distance is necessary to fully expand it.

Turning now to FIG. 5, again there is illustrated apparatus 10 with again the components that it included in the configuration as seen in FIG. 1 with again there being included a second bar 80 secured in the same manner as bar 60 was secured, as illustrated in FIG. 4. Bar 80 has a slot 82 engaged within spring block 36, and secured by hitch pin cotter 33 and with the second end 84 of bar 80 engaged within slot 56 of guide 54. The manner in which bar 80 is utilized is undertaken by end portion 84 which includes a transverse member 88, the transverse member 88 having a plurality of slots 90, 91 and a forward and rear beveled edges 92, 94. This bar is used to unseat a spring which is secured very firmly to its attachment member. The way that this manner operates is that the beveled edge 88 is placed between the spring and an attachment member that it may be attached to, and as the nut 36 is rotated, the beveled edge 92 would work its way beneath the end 40 of spring 24 and would dislodge it and would allow the end of spring 24 to be engaged in either of the forward slots 90, or rear slots 91, in plate 88. After the spring is engaged, for example, if the spring needs to be expanded, then the end 44 of spring 24 would be engaged in slot 91 and then the bar member 24 would be rotated and the spring would move in the direction to retract the bar 80 inward towards the drive block 20 so as to expand the spring as the end 20 is hooked in groove 91. The spring would ultimately be released. If the spring needed to be expanded, then the spring end would be engaged within a forward slot 90 and the spring would be pushed forward by rotation of the drive shaft 24 in the opposite direction and the spring would be disengaged by being retracted inward.

Figure 6:
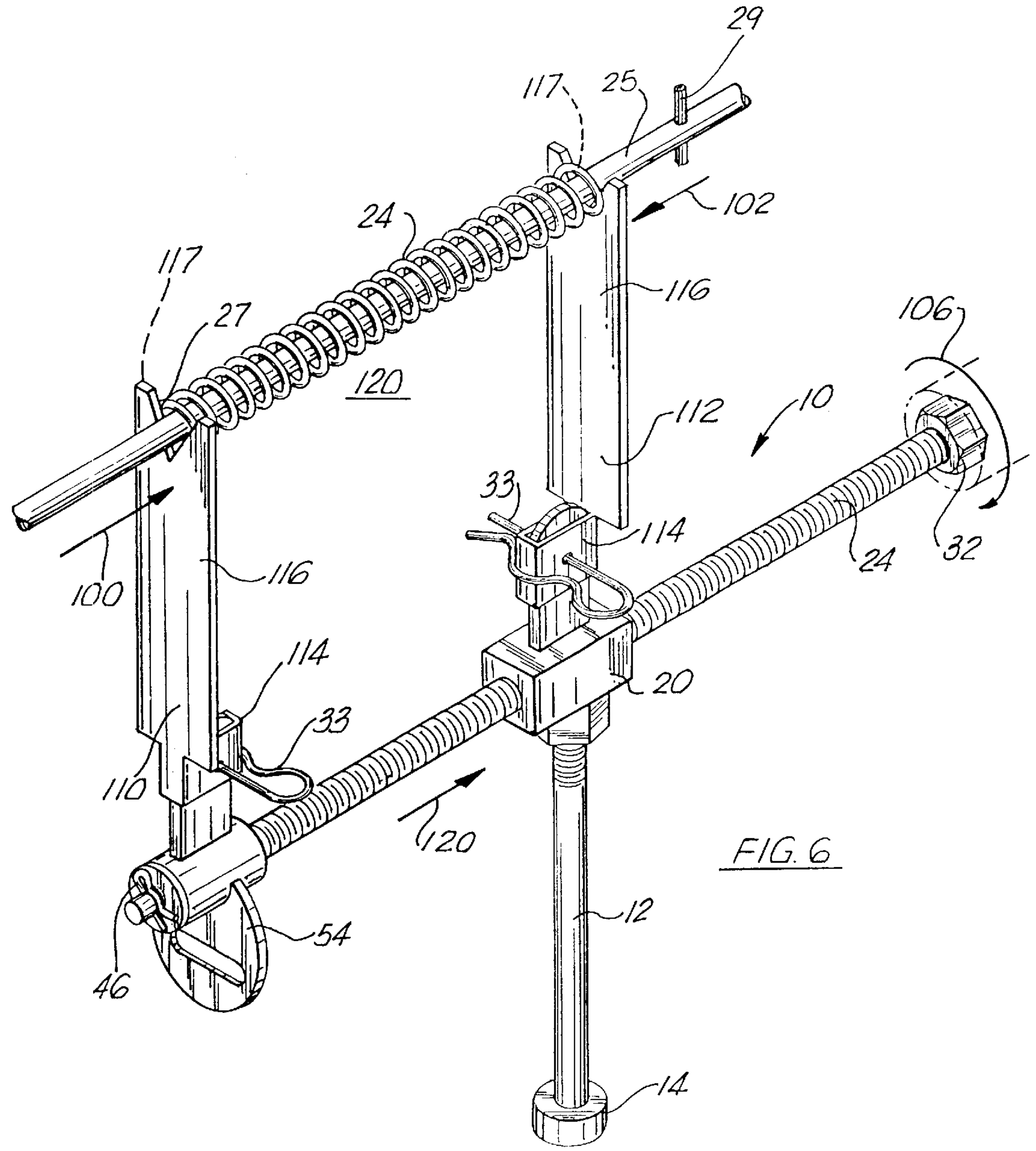
FIG. 6 illustrates the preferred embodiment of the apparatus of the present invention utilized to compress a coil spring on a rod.

Turning now to FIG. 6, there is yet illustrated another accommodation onto apparatus 10 for taking a coil spring 24 that rides on rod 25 and is fixed between bracket 27 and pin 29 and compressing it in the direction of arrows 100 and 102 as illustrated in FIG. 6. Again, the components of the apparatus are in place for allowing the shaft 24 to be rotated in either direction illustrated by arrow 106. In this particular configuration, the apparatus 10 includes the spring members 36 and 48 in the upright position with the guide 54 in the underside position as was illustrated in FIG. 1. However, in this configuration, each of the guide spring blocks 36, 48 have engaged thereupon a first and second spring engagement members 110 and 112 respectively with each of the spring members including a box member 114 which is slidably engagable upon spring blocks 36, 48 as illustrated in FIG. 6 and held immovably by hitch pin cotters 31. There is an upright vertical spring engagement member 116 on each of the members 114 which define a space 120 between each of the members 116 wherein a coil spring 24 is engaged. The rod 25 would normally be placed within the openings 117 in each of the upright members 116 and one member 116 placed against bracket 27 and the other against the end of the spring so that the spring is held in place. Therefore, upon rotation of the nut 36 which would impart rotation to shaft 24 in a certain direction, the shaft 24 would rotate in the direction of arrow 120, which would cause the two vertical members 116 to move closer to one another and compress spring 24 there between to the predetermined compression point. At this point, the pin 29 may be dislodged from the rod 25 and the entire spring may be removed from the rod or the rod removed from the spring, depending on the work to be completed.

Figures 7, 8, 9, 10:
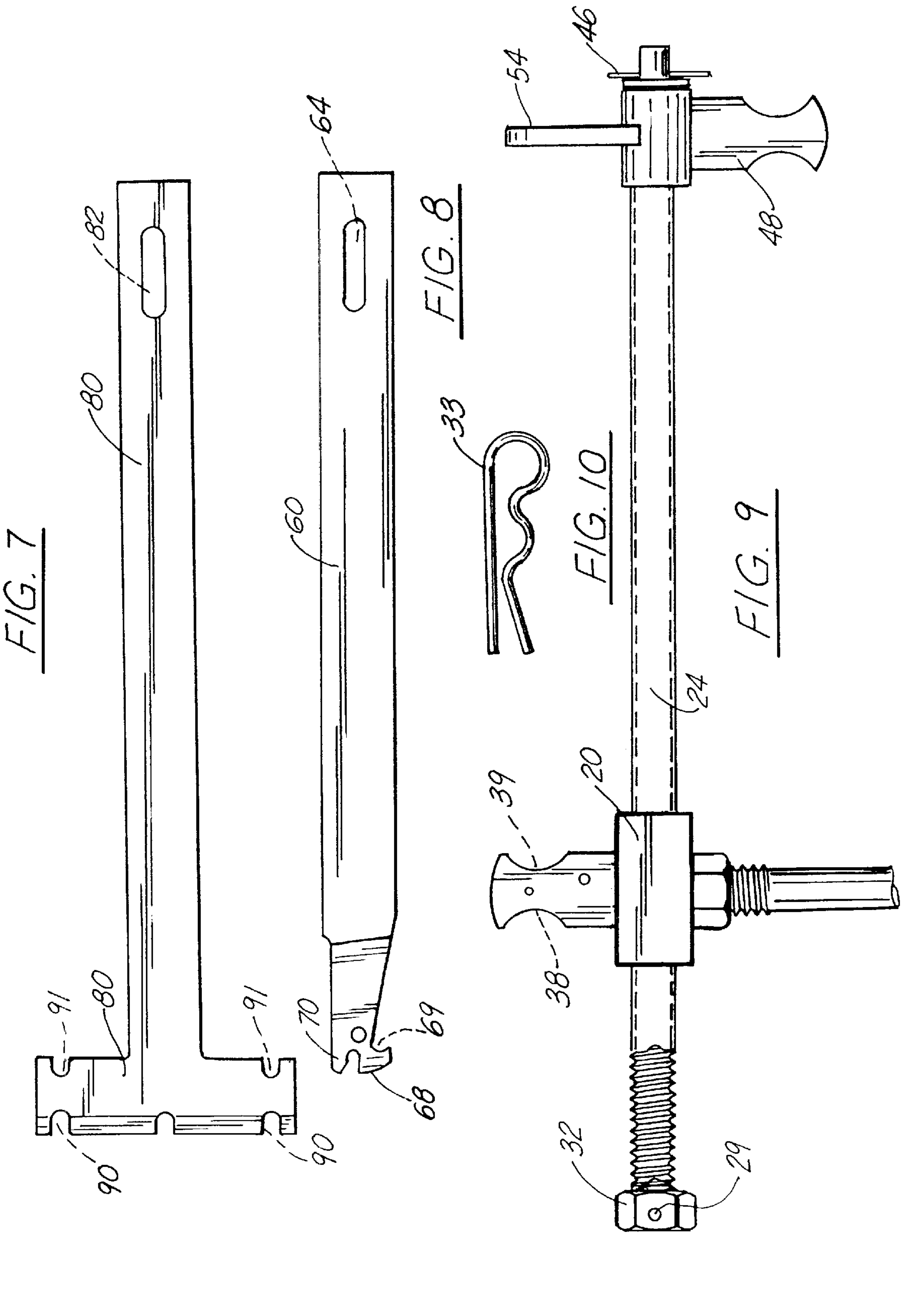
FIG. 7 illustrates the specialized tool member utilized in FIG. 5.
FIG. 8 illustrates the specialized tool member utilized in FIG. 4.
FIG. 9 illustrates a side view of the apparatus of the present invention as would be utilized in the configuration as illustrated in FIG. 5.
FIG. 10 illustrates a cotter pin as would be utilized in FIGS. 1, 4, 5, and 6.

In conclusion, FIGS. 7, 8 and 9 are simply views of tool. FIG. 7 illustrates the parts of the tool which have been described more fully in regard to the use of tool 80 in respect to FIG. 5. Likewise, FIG. 8 illustrates an illustration of tool 60 which was again described more fully in its operation in respect to FIG. 8, and FIG. 9, again is an overall side view of the apparatus 10 within the position that would be used in utilizing tools 7 and 8, i.e. with the guide member 54 placed in the upright position rather than in the underside position as was seen in FIG. 1. The positioning of the guides 60 and 80 of the type as seen in FIGS. 7 and 8 are more fully described in combination with the tool 10 as used in the configuration in FIG. 9 in regard to FIGS. 4 and 5 as was stated earlier.

In conclusion, it should be noted that the tool 60 as seen in FIG. 8, could also be used in relation to the disengagement of a cotter pin 33 from a position on a work piece. For example, the curled ends 68 of tool 60 defines an opening 69 which as seen in FIG. 4 has engaged the end 40 of spring 24. Likewise, when there is a cotter pin 46 of the type as seen in FIG. 4, the end 60 of the bar 60 could simply be wrapped around into the opening 47 of cotter pin 46 and pulled from a work piece in the same manner that the end 40 of the spring 24 is engaged.

The foregoing embodiments are presented by way of example only; the scope of the present invention is to be limited only by the following claims.

What is claimed is:

1. An apparatus for expanding a coiled spring, comprising:

a. an elongated threaded shaft;

b. a drive block moveable along the shaft when the shaft is rotated;

c. a first member on the shaft for engaging a first end of the spring to be expanded;

d. a second member on the drive block for engaging a second end of the spring to be expanded;

e. means for rotating the shaft in a direction to move the drive block away from the first member, so that the spring is expanded to a predetermined point; and f. an elongated handle member engaged to the drive block on a first end and supporting the apparatus on a surface on a second end.

2. The apparatus in claim 1, further comprising hitch pin cotters secured to the first and second members for maintaining the spring engaged on the first and second members.

3. The apparatus in claim 1, wherein the means for rotating the shaft further comprises a hex nut on the end of the shaft for imparting rotation to the shaft.

4. The apparatus in claim 1, further comprising an elongated bar, having a first end positionable on the second member and extending away from the drive block along a plane of the shaft, and a second end to dislodge an end of a coil spring so as to engage the spring on the second end and expand the spring as needed.

5. The apparatus in claims 1, further comprising an elongated bar, having a first end positioned on the first member, and extending away from the drive block along a plane of the shaft, and a second end to hook onto a first end of a coiled spring, and further comprising a chain secured to the second member on its first end and to a remote location on its second end, so that the spring may be expanded to a length greater than the maximum distance between the first and second members.

6. The apparatus in claims 4 or 5, further comprising a guide through which the second end of the elongated bar is supported.

7. An apparatus for compressing a coiled spring, comprising:

a. an elongated threaded shaft;

b. a drive block moveable along the shaft when the shaft is rotated;

c. a first member on the shaft for engaging a first end of the spring to be compressed;

d. a second member on the drive block for engaging a second end of the spring to be compressed;

e. means for rotating the shaft in a direction to move the drive block toward the first member, so that the spring is compressed to a predetermined point;

f. a first plate positioned on the first member and a second plate positioned on the second member, so that when the spring is positioned between the first and second plates, the spring is compressed.

8. The apparatus in claim 7, wherein each of the first and second plates include a slot for guiding the plates along a rod that axially transverses the spring to be compressed.

9. An apparatus for expanding and compressing a coiled spring, comprising:

a. an elongated threaded shaft;

b. a drive block moveable along the shaft when the shaft is rotated;

c. a first member on the shaft for engaging a first end of the spring;

d. a second member on the drive block for engaging a second end of the spring;

e. means for rotating the shaft in a first direction to move the drive block away from the first member, so that the spring is expanded to a predetermined point, and for rotating the shaft in a second direction to move the drive block toward the first member so that the spring is compressed to a predetermined point; and f. an elongated bar, having a first end positionable on the second block and extending away from the drive block along a plane of the shaft, and a second end to dislodge an end of a coil spring so as to engage the spring on the second end to compress the spring as needed.

10. The apparatus in claim 9 further comprising a handle member for holding the apparatus which is in use.

11. The apparatus in claim 9, wherein the means for rotating the shaft further comprises a hex nut on the end of the shaft for imparting rotation to the shaft.

12. The apparatus in claim 9, further comprising an elongated bar, having a first end positioned on the second member, and extending away from the drive block along a plane of the shaft, and a second end to hook onto an end of a coiled spring, and further comprising a chain secured to the first member on its first end and to a remote location on its second end, so that the spring may be expanded to a length greater than the maximum distance between the first and second members.

13. The apparatus in claim 9, wherein the second end of the elongated bar further comprises a slot for engaging a cotter pin and releasing the cotter pin from engagement when the shaft is rotated.

* * * * *